(12) United States Patent
Murai et al.

(10) Patent No.: US 7,097,944 B2
(45) Date of Patent: Aug. 29, 2006

(54) NONAQUEOUS SECONDARY CELL

(75) Inventors: Tetsuya Murai, Kyoto (JP); Hiroshi Mukai, Kyoto (JP)

(73) Assignee: GS Yuasa Corporation, Kyoto (JP)

( * ) Notice: Subject to any disclaimer, the term of this patent is extended or adjusted under 35 U.S.C. 154(b) by 216 days.

(21) Appl. No.: 10/192,688

(22) Filed: Jul. 11, 2002

(65) Prior Publication Data

US 2003/0054259 A1    Mar. 20, 2003

(30) Foreign Application Priority Data

Jul. 12, 2001  (JP) .............................. 2001-211767
Nov. 14, 2001  (JP) .............................. 2001-348541

(51) Int. Cl.
*H01M 6/16* (2006.01)
(52) U.S. Cl. ...................... 429/330; 429/332; 429/331; 429/338; 429/329
(58) Field of Classification Search ................ 429/331, 429/330, 332, 340, 231.4, 231.8, 231.95, 429/338, 329
See application file for complete search history.

(56) References Cited

U.S. PATENT DOCUMENTS

| 6,723,473 | B1 * | 4/2004 | Oura et al. ................. 429/329 |
| 2001/0038949 | A1 * | 11/2001 | Hatazaki et al. ............ 429/338 |
| 2002/0039677 | A1 * | 4/2002 | Iwamoto et al. ............ 429/338 |
| 2002/0192565 | A1 * | 12/2002 | Ueda et al. ................. 429/331 |

FOREIGN PATENT DOCUMENTS

| EP | 1 146 586 | | 10/2001 |
| EP | 1 174 940 | | 1/2002 |
| EP | 1 199 765 | | 4/2002 |
| JP | 4-87156 | | 3/1992 |
| JP | 6-84542 | | 3/1994 |
| JP | 8-45545 | | 2/1996 |
| JP | 2000-235868 | | 8/2000 |
| JP | 2001-6729 | | 1/2001 |
| JP | WO 01/03228 | * | 1/2001 |
| JP | 2001-57235 | * | 2/2001 |
| JP | 2002-42865 | | 2/2002 |
| JP | 2002-158035 | | 5/2002 |
| WO | 02/056408 | | 7/2002 |

OTHER PUBLICATIONS

Database WPI Section Ch, Week 200267, Derwent Publications Ltd., London GB; Class E19, AN 2002-622523 XP002219727 & JP 2002 190316 A (Mitsubishi Chemical Corp.), Jul. 5, 2002, abstract.
Patent Abstracts of Japan, vol. 2002, No. 06, Jun. 4, 2002, & JP 2002 042865 A (At Battery: KK), Feb. 8, 2002, abstract.
Patent Abstracts of Japan, vol. 2000, No. 16, May 8, 2001 & JP 2001 006729 A (Mitsubishi Chemicals Corp.), Jan. 12, 2001, abstract.
Patent Abstracts of Japan, vol. 016, No. 312, Jul. 9, 1992 & JP 04 087156 A (Sanyo Electric Co. Ltd.), Mar. 19, 1992, abstract.

* cited by examiner

*Primary Examiner*—Laura Weiner
(74) *Attorney, Agent, or Firm*—Wenderoth, Lind & Ponack, L.L.P.

(57) ABSTRACT

A nonaqueous secondary cell including the following elements: a positive electrode capable of absorbing and releasing lithium; a negative electrode capable of absorbing and releasing lithium; and a nonaqueous electrolyte including a nonaqueoous solvent and a lithium salt dissolved therein wherein the electrolyte contains a vinyl ethylene carbonate compound represented by the general formula (1)

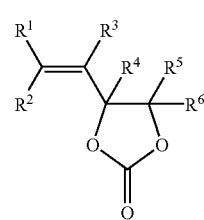

(1)

wherein R1, R2, R3, R4, R5, and R6 represent each independently a hydrogen atom or an alkyl group having from 1 to 4 carbon atoms, and furthermore contains at least a compound selected from the group consisting of vinylene carbonate, a cyclic sulfonic acid ester or a cyclic sulfuric acid ester, and an acid anhydride.

8 Claims, 1 Drawing Sheet

FIG.1

NONAQUEOUS SECONDARY CELL

BACKGROUND OF THE INVENTION

1. Field of the Invention

The present invention relates to a nonaqueous secondary cell.

2. Description of the Prior Art

Recently, owing to the advance in electronic technology, there have been promoted the performance enhancement and miniaturization of electric appliances such as cellular telephones, notebook-type personal computers, video cameras, and the like, and accordingly, there is a strong demand for secondary cells that have high energy densities and can be used in these electric appliances. A representative cell that can meet such a demand is a nonaqueous secondary cell in which lithium salt is used as a negative active material.

A nonaqueous cell comprises, for example, a negative electrode comprising a current collector supporting a carbon material which absorbs and releases lithium ions, a positive electrode comprising a current collector supporting a composite lithium oxide such as a lithium-cobalt composite oxide which absorbs and releases lithium ions, and a separator holding an electrolyte solution dissolving such lithium salts as $LiClO_4$, $LiPF_6$, and the like in an aprotic organic solvent and being interposed between the negative and positive electrodes to prevent short-circuiting of both electrodes.

The positive and negative electrodes are formed in thin sheets or foil shapes, and are piled or wound spirally through a intermediary of the separator to form an electric power generating element. The electric power generating element is housed in either a metallic can made of a stainless steel, a nickel plated iron, or lighter aluminum or a cell container made of laminate film, and subsequently an electrolyte is poured into the cell container, which is sealed for fabricating a cell.

Among a variety of characteristics to be considered such as the charge and discharge characteristics, cycle life characteristics, high-temperature standing characteristics, and the like, the cycle life characteristics capable of suppressing initial-stage performance deterioration over a long period is one of the important characteristics. For example, in a cell in which a carbon material is used as the negative electrode material, the cell characteristics are changed significantly, depending on the kind of the solvent in a nonaqueous electrolyte. It is well known that the electrochemical characteristics of the carbon material can be fully exploited, when such carbonic acid esters as, for example, ethylene carbonate, dimethyl carbonate, vinylene carbonate, or the like is used as a solvent. On the other hand, however, there is a problem that when these solvents are used, the solvents are decomposed while generating gases, and accordingly the cell capacity is gradually lowered with development of the charge and discharge cycles.

In order to solve these problems, a method is proposed in which vinylene carbonate or vinyl ethylene carbonate is added to the electrolyte. For example, in Japanese Patent Laid-Open No. 6-84542, Japanese Patent Laid-Open No. 8-45545, and the like, proposals have been disclosed in which vinylene carbonate is added to the carbonate electrolyte containing ethylene carbonate (EC) as the main component. In Japanese Patent Laid-Open No. 4-87156, a proposal has been made in which vinyl ethylene carbonate is used in a nonaqueous electrolyte cell using metallic lithium for the negative electrode.

Even with these methods, satisfactory cycle life characteristics have not yet been obtained.

On the other hand, the high temperature standing characteristics are an important group of characteristics in a nonaqueous secondary cell, which are assessed by measuring the swelling degree and the discharge capacity of the cell after the cell in a charged state has been allowed to stand for a specified duration in an environment where the temperature is 80° C. or above.

There are available many methods for improving the high temperature standing characteristics, among which are a method in which a solvent having a high boiling point and a low vapor pressure is used, and a method in which the decomposition of the nonaqueous electrolyte on the surfaces of the positive and negative electrodes is suppressed. As in the former case, however, when a solvent having a high boiling point and a high vapor pressure is used, there occur a problem that generally the viscosity of such a solvent is high and the electric conductivity of the nonaqueous electrolyte is lowered, and hence the discharge characteristics of the cell are lowered, and the like. In order to overcome this problem, a method has been proposed in which γ-butyrolactone that has a high dielectric constant and a high boiling point and the like is used (Japanese Patent Laid-Open No. 2000-235868).

γ-Butyrolactone, however, tends to undergo reductive oxidation on the negative electrode while charging, and thereby occurs a problem that the resulting decomposition products cause clogging of the separator and the surface resistance of the negative electrode is increased, leading to a remarkable capacity lowering after repetition of charge and discharge cycles.

For the purpose of suppressing the reductive decomposition of the solvent on the negative electrode, a number of methods have been proposed in which, in order to suppress the reductive decomposition of a lithium salt, a compound which forms a so-called SEI (solid electrolyte interface) on the negative electrode is added to the electrolyte (Japanese Patent Laid-Open No. 2001-6729).

When these SEI forming agents are used, a low-conductivity and high-resistance SEI is formed on the negative electrode, and accordingly there occur problems that the charge and discharge performance of the cell is remarkably lowered, that the swelling of the cell becomes remarkable owing to the elevated internal pressure due to the gas generated by the decomposition of the surplus portion of the added SEI forming agent when the SEI agent is added in excess, and the like.

The present invention has been developed for the purpose of overcoming the above described problems, and an object of the present invention is to provide a nonaqueous secondary cell having excellent charge and discharge characteristics, cycle life characteristics, and high-temperature standing characteristics.

SUMMARY OF THE INVENTION

The nonaqueous secondary cell of the present invention, which is composed of a positive electrode capable of absorbing and releasing lithium, a negative electrode capable of absorbing and releasing lithium, and a nonaqueous electrolyte, is characterized in that: the electrolyte comprises a nonaqueous solvent, a lithium compound, a vinyl ethylene carbonate compound represented by the general formula (1), wherein R1, R2, R3, R4, R5, and R6 represent each independently a hydrogen atom or an alkyl group having from 1 to 4 carbon atoms, and at least a compound selected from the group consisting of vinylene carbonate, a cyclic sulfonic acid ester or a cyclic sulfuric acid ester, and a cyclic acid anhydride.

According to the present invention, a nonaqueous secondary cell can be obtained which is excellent in the charge and discharge characteristics and cycle life characteristics, and furthermore small in swelling caused by being allowed to stand at high temperature. The reasons for that is no yet clear, but one reason for the improved charge and discharge characteristics may be ascribable to the observation that a vinyl ethylene carbonate compound represented by the general formula (1) forms a negative electrode film, having a high conductivity for lithium ion, on the negative active material surface. The improved charge and discharge cycle life characteristics are supposed to be ascribable to the fact that the formed film has a high stability, and plays a role as a protection film which suppresses the reductive decomposition of the nonaqueous solvent. Furthermore, since the film retains its high stability even at high temperature, the gas generation caused by the reductive decomposition of the nonaqeous solvent is supposed to be suppressed, accordingly suppressing the swelling of the cell due to the elevated internal pressure even when the cell is allowed to stand at high temperature.

DESCRIPTION OF THE PREFERRED EMBODIMENTS

In the present invention, when a negative electrode comprises mainly a carbon material, the cycle life can be improved by making the electrolyte to contain vinyl ethylene carbonate and vinylene carbonate.

The conductivity lowering in the electrolyte can be prevented by making a nonaqueous solvent to contain γ-butyrolactone having a high dielectric constant and a high boiling point, and thus a nonaqueous secondary cell can be obtained which is excellent in the high rate discharge characteristics.

The above described cyclic sulfonic acid ester is preferably at least an ester selected from the group consisting of 1,3-propane sultone, 1,4-butane sultone, 1,3-butane sultone, and 1,3-propene sultone, and the above described cyclic sulfuric acid is preferably glycol sulfate.

The above described cyclic acid anhydride is preferably at least an acid anhydride selected from the group consisting of succinic anhydride, glutaric anhydride, maleic anhydride, citraconic anhydride, diglycolic anhydiride, cyclohexanedicarboxylic anhydride, 4-cyclohexene-1,2-dicarboxylic anhydirde, 3,4,5,6-tetrahydrophthalic anhydride, 5-norbornene-2,3-dicarboxylic anhydride, phenylsuccinic anhydride, and 2-phenylglutaric anhydride.

The reason for this is that a nonaqueous secondary cell can be obtained that is furthermore excellent in cycle life characteristics and charge and discharge characteristics. These compounds are, moreover, easily available and easy to use.

The above described lithium salts preferably include $LiBF_4$ and $LiPF_6$, because a stable negative electrode film can be formed by adding an appropriate amount of $LiPF_6$ to the lithium salt containg $LiBF_4$ as a main component, and a nonaqueous secondary cell can be obtained which is improved in charge and discharge characteristics and cycle life characteristics.

A nonaqueous secondary cell can be obtained which is excellent in cycle life characteristics and high-temperature standing characteristics by setting the total content of a vinyl ethylene carbonate compound, vinylene carbonate, a cyclic sulfonic acid ester or a cyclic sulfuric acid ester, and a cyclic acid anhydride to be 0.05 wt % or above and 5 wt % or below, relative to the total weight of the electrolyte.

When the total content of a vinyl ethylene carbonate compound, vinylene carbonate, a cyclic sulfonic acid ester or a cyclic sulfuric acid ester, and a cyclic acid anhydride is lower than 0.05 wt %, the protection film for a negative electrode is not sufficiently formed so that satisfactory cycle life characteristics are not attained. When the total content is higher than 5 wt %, the surplus portion undergoes oxidative decomposition to generate gas, causing the increased swelling of the cell.

When the negative electrode is mainly composed of a carbon material, and the electrolyte contains vinyl ethylene carbonate and vinylene carbonate, the cycle life characteristics of a nonaqueous secondary cell can be remarkably improved by making the nonaqueous solvent to contain a cyclic carbonate and a chain carbonate, and by setting the content of vinyl ethylene carbonate to be 0.01 wt % or above and 2 wt % or below, and the content of vinylene carbonate to be 0.01 wt % or above and 5 wt % or below, relative to the weight of the nonaqueous solvent.

This may be ascribed to the observation that the decomposition deterioration of the carbonates is suppressed, since vinyl ethylene carbonate and vinylene carbonate tend to reside near the negative electrode so that easily degradable carbonates hardly approach the negative electrode, when a nonaqueous carbonate containing solvent is made to contain vinyl ethylene carbonate and vinylene carbonate.

Although the contents of vinyl ethylene carbonate and vinylene carbonate in the electrolyte may be adjusted appropriately according to the composition of the electrolyte, the content of vinyl ethylene carbonate relative to the quantity of the nonaqueous solvent is preferably 0.01 wt % or above and 2 wt % or below, more preferably 0.25 wt % or above and 1 wt % or below, and the content of vinylene carbonate relative to the quantity of the nonaqueous solvent is preferably 0.01 wt % or above and 5 wt % or below, more preferably 0.25 wt % or above and 2 wt % or below. These preferable and more preferable contents are derived from the observations that no effects are obtained when the contents are too small, and when the contents are too high, the swelling of the cell is promoted as for vinyl ethylene carbonate, and particularly the high rate discharge characteristics are degraded as for vinylene carbonate.

The content of an above described cyclic carbonate is preferably 20 vol % or above and 50 vol % or below relative to the total volume of the nonaqueous solvent.

As described above, by defining the contents of the carbonates to be within the above described ranges, the high rate discharge characteristics and cycle life characteristics of a nonaqueous secondary cell can be improved. In particular, when ethylene carbonate is used as a cyclic carbonate, the cycle life characteristics are improved remarkably. Incidentally, other solvents may be mixed together.

In addition, the chain carbonate is preferably a carbonate selected from dimethyl carbonate, diethyl carbonate, and methyl ethyl carbonate, because the cycle life characteristics of a nonaqueous cell are thereby improved remarkably.

Incidentally, when a carbon material of high crystallinity is used for the negative electrode in the above described secondary cell, the cycle life characteristics can be remarkably improved.

DETAILED DESCRIPTION OF THE PREFERRED EMBODIMENTS

An embodiment of the present invention will be described below by referring to the drawings.

Figure 1:
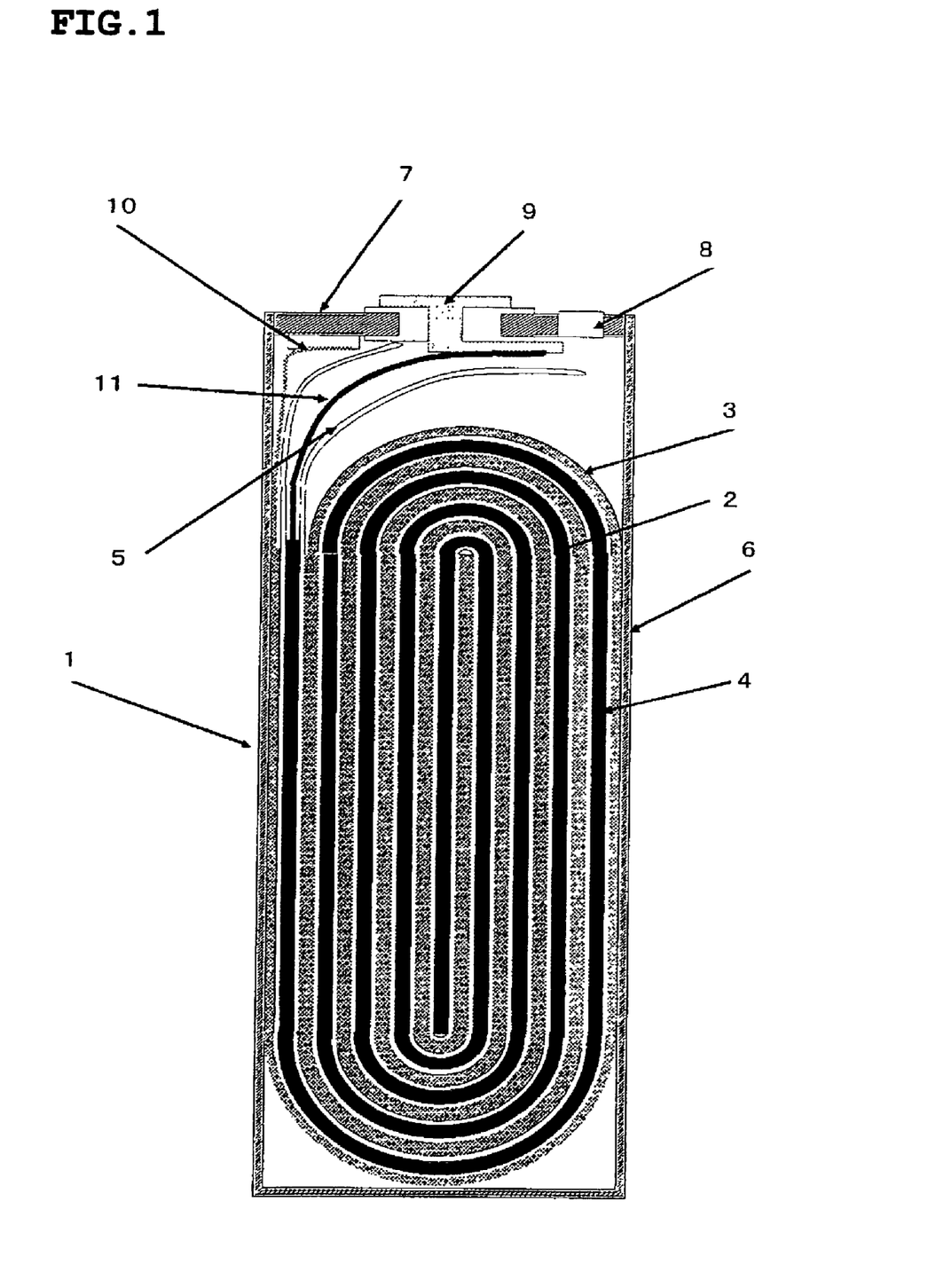
FIG. 1 is a schematic sectional view of a prismatic nonaqueous secondary cell of the present invention.

FIG. 1 is a schematic sectional view of a prismatic nonaqueous secondary cell related to an embodiment of the present invention. The prismatic nonaqueous secondary cell 1 is constructed by housing into a cell case 6 a flat roll-shaped group of electrodes 2 formed by winding a positive electrode 3 and a negative electrode 4 with a interposing separator 5 therebetween. A nonaqueous electrolyte containing an electrolyte salt and an electrolyte are not shown in the FIGURE.

A cell cap 7 equipped with a safety valve 8 is fixed to a cell case 6 by laser welding, a negative electrode terminal 9 is connected to a negative electrode 4 via a lead wire for the negative electrode 11, and a positive electrode 3 is connected to the cell cap 7 via a lead wire for the positive electrode 10.

The positive electrode 3 has a structure in which a positive active material layer composed of a substance capable of absorbing and releasing lithium ion is formed on a positive electrode current collector made of, for example, aluminum, nickel, or stainless steel. As a positive active material, there can be used an inorganic compound such as a composite oxide represented by any one of the composition formulas $Li_xMO_2$, $Li_yM_2O_4$, or $Na_xMO_2$ (M stands for one or more kinds of transition metals, $0 \leq x \leq 1$, $0 \leq y \leq 2$), and a metal chalcogenide or a metal oxide which has either a tunnel structure or a layer structure.

Specifically, the following inorganic compounds can be used as a positive active material: $LiCoO_2$, $LiNiO_2$, $LiCo_xNi_{1-x}O_2$, $LiMn_2O_4$, $Li_2Mn_2O_4$, $MnO_2$, $FeO_2$, $V_2O_5$, $V_6O_{13}$, $TiO_2$, $TiS_2$, and the like. In this connection, as for organic compounds, a conducting polymer such as polyaniline and the like can be used. Any mixture of the above described active materials, irrespective of whether inorganic or organic, may be used.

The negative electrode 4 has a structure in which a negative active material layer capable of absorbing and releasing lithium ion is formed on a negative electrode current collector made of, for example, copper, nickel, or stainless steel. As a negative active material, there can be used, either individually or as mixtures of two or more species, the alloys of Li with Al, Si, Pb, Sn, Zn, Cd, and the like, metal oxides such as $LiFe_2O_3$, $WO_2$, $MoO_2$, $SiO$, $CuO$, and the like, lithium nitrides such as $Li_3N$ and the like, or metallic lithium and the like, and carbon materials such as natural graphite, artificial graphite, coke, non-graphatizable carbon, thermally decomposed resins, and the like. In particular, when a carbon material of relatively higher crystallinity is used in which the spacing for the lattice planes (002), that is, the d value (d002) is 3.37 Å or below, the effect of the present invention is exhibited remarkably. As such carbon materials of higher crystallinity, there are available graphites (natural graphite, artificial graphite, modified materials therefrom, and the like), a modified coke which has such a high crystallinity, attained by high pressure processing, that the d002 value is 3.37 Å or below, and the like.

As a separator 5, there can be used woven cloth, nonwoven cloth, microporous synthetic resin film, and the like, and particularly microporous synthetic resin film can be used suitably. Among others, the microporous films made of polyethylene and polypropylene, and the polyolefin-based microporous films such as the microporous films derived from combination thereof are used suitably in view of the film thickness, film strength, film resistance, and the like.

As nonaqueous solvents composing the nonaqueous electrolyte, there may be used such polar solvent, individually or as mixture, as ethylene carbonate, propylene carbonate, butylene carbonate, dimethyl carbonate, ethyl methyl carbonate, diethyl carbonate, γ-butyrolactone, sulfolane, dimethyl sulfoxide, acetonitrile, dimethyl formamide, dimethyl acetamide, 1,1-dimethoxyethane, 1,2-dimethoxyethane, 1,1-diethoxyethane, 1,2-diethoxyethane, tetrahydrofuran, 2-methyltetrahydorfuran, dioxolane, methyl acetate, acetate compounds, and the like.

The lithium salts to be dissolved in organic solvents may include such salts as $LiPF_6$, $LiClO_4$, $LiBF_4$, $LiAsF_6$, $LiCF_3CO_2$, $LiCF_3(CF_3)_3$, $LiCF_3(C_2F_5)_3$, $LiCF_3SO_3$, $LiN(SO_2CF_3)_2$, $LiN(SO_2CF_2CF_3)_2$, $LiN(COCF_3)_2$, $LiN(COCF_2CF_3)_2$, $LiPF_3(CF_2CF_3)_3$, and mixtures thereof.

Solid electrolytes such as polymer solid electrolytes each containing a liquid electrolyte, which work simultaneously as a separator, can be used. In this case, when a porous polymer solid electrolyte film is used, the solid electrolyte film can be made to contain a liquid electrolyte. When a gelled polymer solid electrolyte is used, the gelled polymer solid electrolyte composing the gel and the liquid electrolyte contained in the pores and the like may be different from each other. Synthetic resin microporous films and polymer solid electrolytes each containing a liquid electrolyte and the like may be used in combination.

The present invention can be applied to such a various shapes of nonaqueous secondary cells as prismatic, elliptical, coin-shaped, button-shaped, sheet-shaped, and the like, without restrictions in the cell shape. The present invention intends to suppress the swelling of a cell when the cell is allowed to stand at high temperature, and accordingly the present invention provides remarkable effects when cell cases weak in mechanical strength are used, in particular, cases made of aluminum or aluminum laminate.

As described above, as for the cell-composing materials in a nonaqueous secondary cell of the present invention, a variety of conventional materials which have been proposed for use in nonaqueous secondary cells and used practically can be used without any particular restrictions.

EXAMPLES

While specific examples as applications of the present invention will be described below, but the present invention is not construed to be limited by the present examples, and modifications and variations can be effected without departing from the spirit and scope of the present invention.

In Examples 1 to 15 and Comparative Examples 1 to 3, prismatic nonaqueous secondary cells 1 shown in FIG. 1 were fabricated. The positive electrode was formed as follows: A positive composite was prepared by mixing polyfluorovinylidene (8 wt %) as a binder, acetylene black (5 wt %) as a conducting material, and a lithium cobalt composite oxide (87 wt %) as a positive active material. N-methyl-2-pyrrolidone was added to the positive composite to prepare a pasty positive composite. The pasty positive composite was applied onto both sides of an aluminum foil current collector of 20 μm in thickness and the coated layers were dried.

A negative electrode was formed as follows: A pasty composite was prepared from graphite (95 wt %), carboxymethyl cellulose (2 wt %), styrene-butadiene rubber (3 wt %), and an appropriate amount of water. The pasty composite was applied onto both sides of a copper foil current collector of 15 μm in thickness, and the coated layers were dried.

A sheet of polyethylene microporous film was used as a separator. Electrolytes were prepared as follows: Di-normal-butyl carbonate (DNBC) (3 wt %) was added to a mixed solvent of ethylene carbonate (EC) and γ-butyrolactone (GBL) (3:7 volume ratio), and then $LiBF_4$ was dissolved in a concentration of 1.5 mol/l. To this solution, the additives as specified in Examples 1 to 15, and Comparative Examples 1 to 3 were separately added to obtain the electrolytes containing different additives. The reason why DNBC is used in the present invention is that the addition of DNBC is more preferable when EC and GBL are used. By adding DNBC, the wetness of the separator is improved, and the discharge performance and life performance become satisfactory.

By using the above described constituent elements, the nonaqueous secondary cells in Examples 1 to 15 and Comparative Examples 1 to 3 were fabricated. The added amount of an additive is represented by the weight ratio (wt %) to the total weight of the above described electrolyte.

Example 1

Vinyl ethylene carbonate (VEC) (1 wt %) and vinylene carbonate (VC) (1 wt %) were added.

Example 2

VEC (0.04 wt %) and VC (0.01 wt %) were added.

Example 3

VEC (0.5 wt %) and VC (0.5 wt %) were added.

Example 4

VEC (1 wt %) and VC (2 wt %) were added.

Example 5

VEC (1 wt %) and VC (3 wt %) were added.

Example 6

VEC (1 wt %) and VC (4 wt %) were added.

Example 7

VEC (1 wt %) and VC (5 wt %) were added.

Example 8

VEC (1 wt %) and 1,3-propane sultone (1 wt %), a cyclic sulfonic acid ester, were added.

Example 9

VEC (1 wt %) and 1,3-butane sultone (1 wt %), a cyclic sulfonic acid ester, were added.

Example 10

VEC (1 wt %) and 1,4-butane sultone (1 wt %), a cyclic sulfonic acid ester, were added.

Example 11

VEC (1 wt %) and 1,3-propene sultone (1 wt %), a cyclic sulfonic acid ester, were added.

Example 12

VEC (1 wt %) and glycol sulfate (1 wt %), a cyclic sulfuric acid ester, were added.

Example 13

VEC (1 wt %) and a cyclic acid anhydride of succinic anhydride (1 wt %) were added.

Example 14

VEC (1 wt %) and maleic anhydride (1 wt %), a cyclic acid anhydirde, were added.

Example 15

The same as in Example 1 except that an electrolyte salt of $LiPF_6$ was added in a concentration of 0.1 mol/l.

Comparative Example 1

No additives were added.

Comparative Example 2

VEC (1 wt %) was added.

Comparative Example 3

VC (1 wt %) was added.

On the eighteen kinds of prismatic nonaqueous secondary cells (30 mm in width, 48 mm in height, 5 mm in thickness) fabricated as described above in Examples 1 to 15 and Comparative Examples 1 to 3, there were investigated the charge and discharge characteristics (initial capacity and discharge capacity at 0° C.), cycle life characteristics (capacity retention after 500 cycles), and cell thickness increments after being allowed to stand at a high temperature.

The initial capacity is the discharge capacity as measured under the following charge and discharge conditions: charge: 600 mA constant current/4.20 V constant voltage× 2.5 hrs. (room temperature); and discharge: 600 mA constant current and 2.75 V cut-off voltage (room temperature).

The discharge capacity at 0° C. is the discharge capacity as measured under the following charge and discharge conditions:
charge: 600 mA constant current/4.20 V constant voltage× 2.5 hrs. (room temperature);
standing at 0° C. for 10 hrs.; and
discharge: 600 mA constant current and 2.75 V cut-off voltage (0° C.).

With a cell which had been subjected to the initial capacity measurement, the charge and discharge cycle was repeated 500 cycles under the following conditions:
charge: 600 mA constant current/4.20 V constant voltage× 2.5 hrs. (25° C.); and
discharge: 600 mA constant current and 2.75 V cut-off voltage (25° C.).

The capacity retention at the 500th cycle is defined as follows:
capacity retention at 500th cycle (%)=discharge capacity at 500th cycle/discharge capacity at first cycle×100.

The cell thickness increment after being allowed to stand at a high temperature is the cell thickness increment as measured below:

A cell which has been subjected to the initial capacity measurement was charged under the conditions of 600 mA constant current/4.20 V constant voltage×2.5 hrs. (room temperature); allowed to stand at 80° C. for 200 hrs.; cooled down to room temperature; and then subjected to the cell thickness increment measurement.

The measurement results described above are shown in Table 1.

TABLE 1

| | Composition of additive wt % | | Discharge capacity mA | | Capacity retention at 500th cycle | Cell thickness increment |
|---|---|---|---|---|---|---|
| | VEC | Others | Initial | 0° C. | % | mm |
| Example 1 | 1 | 1 | 605 | 505 | 80 | 0.2 |
| Example 2 | 0.04 | 0.01 | 601 | 483 | 72 | 0.2 |
| Example 3 | 0.5 | 0.5 | 602 | 477 | 76 | 0.2 |
| Example 4 | 1 | 2 | 604 | 510 | 80 | 0.2 |
| Example 5 | 1 | 3 | 603 | 515 | 81 | 0.2 |
| Example 6 | 1 | 4 | 601 | 514 | 84 | 0.3 |
| Example 7 | 1 | 5 | 602 | 513 | 85 | 3.2 |
| Example 8 | 1 | 1 | 605 | 512 | 84 | 0.1 |
| Example 9 | 1 | 1 | 599 | 467 | 77 | 0.1 |
| Example 10 | 1 | 1 | 598 | 459 | 74 | 0.1 |
| Example 11 | 1 | 1 | 601 | 435 | 76 | 0.1 |
| Example 12 | 1 | 1 | 608 | 503 | 81 | 0.1 |
| Example 13 | 1 | 1 | 601 | 475 | 71 | 0.1 |
| Example 14 | 1 | 1 | 600 | 475 | 72 | 0.1 |
| Example 15 | 1 | 1 | 605 | 525 | 84 | 0 |
| Comparative example 1 | 0 | 0 | 554 | 255 | 12 | 0.9 |
| Comparative example 2 | 1 | 0 | 598 | 280 | 67 | 0 |
| Comparative example 3 | 0 | 1 | 599 | 474 | 34 | 0.1 |

As can be seen from Table 1, as for the cell of Comparative Example 1 in which no additive was added to the electrolyte, both initial discharge capacity and discharge capacity at 0° C. are small, the cell thickness increment after standing at a high temperature is large, and the cycle life characteristic (capacity retention) is poor. As for the cell of Comparative Example 2 in which VEC, a vinyl ethylene compound represented by the general formula (1), was added alone to the electrolyte, the capacity retention is improved whereas the discharge capacity at 0° C. is remarkably small. As for the cell of Comparative Example 3 in which VC was added alone to the electrolyte, the charge and discharge characteristics are excellent whereas the capacity retention is poor.

On the contrary, as for the cells of Examples 1 to 7 in which both VEC and VC were added, the discharge capacity at 0° C. are large, and the charge and discharge characteristics are improved. As can be seen from Example 2, the addition of VEC and VC has been found to be effective when the total addition amount is 0.05 wt % or above. In the cell of Example 7 in which the total addition amount of VEC and VC is 5 wt % or above, the cell thickness increment after storage at a high temperature is large. This may be ascribed to the gas generated by the decomposition reaction of the surplus portion of VC in the electrolyte with the positive electrode. Consequently, the total addition amount of VEC and VC is found to be preferably 0.05 wt % or above and 5 wt % or below.

In the cells of Examples 8 to 11 in which, in place of VC, cyclic sulfonic acid esters of 1,3-propane sultone, 1,3-butane sultone, 1,4-butane sultone, and 1,3-propene sultone were added, the effects similar to those provided by the addition of VC could be obtained.

Furthermore, in the cells of Examples 12 to 14 in which glycol sulfate as a cyclic sulfuric acid ester and succinic anhydride and maleic anhydride as cyclic acid anhydrides were added, the effects similar to those provided by the addition of VC could be obtained.

While $LiBF_4$ was added alone as an electrolyte salt in Examples 1 to 14, a further addition of $LiPF_6$ in 0.1 mol/l, as in Example 15, was found to improve the low-temperature discharge characteristics and life characteristics. This may be ascribed to the film formed by $LiPF_6$ on the negative electrode which film is low in resistance and stable. Thus, it is preferable that the electrolyte salts used include both $LiBF_4$ and $LiPF_6$.

Although in the above described Examples, cyclic sulfonic acid esters, cyclic sulfuric acid esters, and cyclic acid anhydrides were added separately in place of VEC and VC, or VC, these cyclic acid esters and anhydrides can be used as mixtures thereof. Although in the above described examples, a mixed solvent consisting of ethylene carbonate and γ-butyrolactone, which is liable to undergo reductive decomposition and has a low vapor pressure, was used as a main solvent, similar effects were obtained when ethylene carbonate and chain carbonates were used as solvents, and when the kinds and concentrations of the salts were varied.

In Examples 16 to 31 and Comparative Examples 4 to 9, similarly a prismatic cell 1 shown in FIG. 1 was fabricated in each example. The positive electrode was formed as follows: A positive composite was prepared by mixing polyfluorovinylidene (8 wt %) as a binder, acetylene black (4 wt %) as a conducting material, and a spinel manganese composite oxide particles (88 wt %) as a positive active material. N-methyl-2-pyrrolidone was added to the positive composite to prepare a pasty positive composite. The pasty positive composite was applied onto both sides of an aluminum foil current collector of 20 μm in thickness and then the coated layers were dried at 150° C. for 2 hrs.

A negative electrode was formed as follows: A pasty composite was prepared by mixing artificial graphite powder (92 wt %) with polyfluorovinylidene (8 wt %) as a binder, and then adding N-methyl-2-pyrrolidone. The pasty composite was applied onto both sides of a copper foil current collector of 14 μm in thickness, and the coated layers were dried.

A sheet of polypropylene microporous film was used as a separator.

The nonaqueous secondary cells (30 mm in width, 48 mm in height, 5 mm in thickness) of Examples 16 to 31 and Comparative Examples 4 to 9 were fabricated by assembling the above described constituent elements, injecting the electrolytes described below through an inlet, and then sealing the inlet (see Table 2 or Table 4).

Example 16

A nonaqueous secondary cell was fabricated by using a nonaqueous electrolyte prepared by adding vinyl ethylene carbonate (VEC) (0.3 wt %) and vinylen carbonate (VC) (0.5 wt %) as additives to a mixed solvent (a nonaqueous solvent of the present invention) consisting of ethylene carbonate (EC) (30 vol %) and dimethyl carbonate (DMC) (70 vol %), and further dissolving $LiPF_6$ as an electrolyte salt in a ratio of 1 mol/l.

Example 17

A nonaqueous electrolyte was used which was prepared in the same manner as in Example 16 except that the mixed solvent was replaced with a mixed solvent consisting of EC (30 vol %) and diethyl carbonate (DEC) (70 vol %).

Example 18

A nonaqueous electrolyte was used which was prepared in the same manner as in Example 16 except that the mixed solvent was replaced with a mixed solvent consisting of EC (30 vol %), DMC (40 vol %), and DEC (30 vol %).

Comparative Example 4

A nonaqueous electrolyte was used in which $LiPF_6$ was dissolved in a ratio of 1 mol/l in a mixed solvent consisting of EC (30 vol %) and DMC (70 vol %).

Comparative Example 5

A nonaqueous electrolyte was used which was prepared in the same manner as in Comparative Example 4 except that the mixed solvent was replaced with a mixed solvent consisting of EC (30 vol %) and DEC (70 vol %).

Comparative Example 6

A nonaqueous electrolyte was used which was prepared in the same manner as in Comparative Example 4 except that the mixed solvent was replaced with a mixed solvent consisting of EC (30 vol %), DMC (40 vol %), and DEC (30 vol %).

Example 19

A nonaqueous secondary cell was fabricated by using the nonaqueous electrolyte prepared by adding vinyl ethylene carbonate (VEC) (0.3 wt %) and vinylen carbonate (VC) (0.5 wt %) as additives to a mixed solvent consisting of EC (10 vol %) and DMC (90 vol %), and further dissolving $LiPF_6$ as an electrolyte salt in a ratio of 1 mol/l.

Example 20

A nonaqueous electrolyte was used which was prepared in the same manner as in Example 19 except that the mixed solvent was replaced with a mixed solvent consisting of EC (20 vol %) and DMC (80 vol %).

Example 21

A nonaqueous electrolyte was used which was prepared in the same manner as in Example 19 except that the mixed solvent was replaced with a mixed solvent consisting of EC (30 vol %) and DMC (70 vol %)

Example 22

A nonaqueous electrolyte was used which was prepared in the same manner as in Example 19 except that the mixed solvent was replaced with a mixed solvent consisting of EC (40 vol %) and DMC (60 vol %).

Example 23

A nonaqueous electrolyte was used which was prepared in the same manner as in Example 19 except that the mixed solvent was replaced with a mixed solvent consisting of EC (50 vol %) and DMC (50 vol %).

Example 24

A nonaqueous electrolyte was used which was prepared in the same manner as in Example 19 except that the mixed solvent was replaced with a mixed solvent consisting of EC (60 vol %) and DMC (40 vol %).

Example 25

A nonaqueous electrolyte was used which was prepared in the same manner as in Example 19 except that the mixed solvent was replaced with a mixed solvent consisting of EC (80 vol %) and DMC (20 vol %).

Example 26

A nonaqueous secondary cell was fabricated by using a nonaqueous electrolyte prepared by adding vinyl ethylene carbonate (VEC) (0.01 wt %) and vinylene carbonate (VC) (0.01 wt %) as additives to a mixed solvent consisting of ethylene carbonate (EC) (30vol %) and dimethyl carbonate (DMC) (70vol %), and further dissolving $LiPF_6$ as an electrolyte salt in a ratio of 1 mol/l.

Example 27

A nonaqueous electrolyte was used which was prepared in the same manner as in Example 26 except that the additives were replaced with VEC (0.5 wt %) and VC (0.5 wt %).

Example 28

A nonaqueous electrolyte was used which was prepared in the same manner as in Example 26 except that the additives were replaced with VEC (0.01 wt %) and VC (5 wt %).

Example 29

A nonaqueous electrolyte was used which was prepared in the same manner as in Example 26 except that the additives were replaced with VEC (2 wt %) and VC (0.01 wt %).

Example 30

A nonaqueous electrolyte was used which was prepared in the same manner as in Example 26 except that the additives were replaced with VEC (2 wt %) and VC (5 wt %).

Example 31

A nonaqueous electrolyte was used which was prepared in the same manner as in Example 26 except that the additives were replaced with VEC (4 wt %) and VC (8 wt %).

Comparative Example 7

A nonaqueous electrolyte was used which was prepared in the same manner as in Example 26 except that no additives were used.

Comparative Example 8

A nonaqueous electrolyte was used which was prepared in the same manner as in Example 26 except that only VC (0.5 wt %) was used as an additive.

Comparative Example 9

A nonaqueous electrolyte was used which was prepared in the same manner as in Example 26 except that only VEC (0.5 wt %) was used as an additive.

On the cells fabricated as described above in Examples 16 to 18 and Comparative Examples 4 to 6, the cycle life test was performed under the following condition for the purpose of investigating the effect of the additives on the cycle life characteristics. The initial cycle discharge capacity was 380 mAh for anyone of the cells. The weight percentage of an additive was calculated with the equation:

The weight % of an additive=the weight of the additive/the weight of the mixed solvent (nonaqueous solvent)×100 (%).

The first cycle discharge was conducted under the following conditions:
charge: 380 mA constant current/4.1 V constant voltage×5 hrs. (25° C.); and
discharge: 380 mA constant current, 2.75V cut-off voltage (25° C.).

Then, the cycle life test for from the second through the 399th cycles was performed under the following condition:
charge: 380 mA constant current/4.1 V constant voltage×5 hrs. (45° C.); and
discharge: 380 mA constant current, 2.75V cut-off voltage (45° C.).

The cycle life test for the 400th cycle was performed under the following condition:
charge: 380 mA constant current/4.1 V constant voltage×5 hr. (25° C.); and
discharge: 380 mA constant current, 2.75V cut-off voltage (25° C.).

The capacity retentions at the 400th cycle are shown in Table 2.

TABLE 2

| | Composition of mixed solvent vol % | | | Composition of additive wt % | | Capacity retention at 400th cycle |
|---|---|---|---|---|---|---|
| | EC | DMC | DEC | VEC | VC | % |
| Example 16 | 30 | 70 | 0 | 0.3 | 0.5 | 81.4 |
| Example 17 | 30 | 0 | 70 | 0.3 | 0.5 | 80.2 |
| Example 18 | 30 | 40 | 30 | 0.3 | 0.5 | 81.4 |
| Comparative example 4 | 30 | 70 | 0 | 0 | 0 | 59.8 |
| Comparative example 5 | 30 | 0 | 70 | 0 | 0 | 60.2 |
| Comparative example 6 | 30 | 40 | 30 | 0 | 0 | 61.3 |

As shown in Table 2, the capacity retentions at the 400th cycle are so large as to exceed 80% for the cells in Examples 16 to 18 which are different from each other in mixed solvent composition but have VEC and VC added as additives. On the contrary, the capacity retentions at the 400th cycle are so low as to be 61.3% or below for the cells of Comparative Examples 4 to 6 which do not contain any additive. Thus, it has been found that the lowering of the discharge capacity caused by the decomposition of the nonaqueous solvent during charge and discharge cycles is suppressed by containing vinyl ethylene carbonate (VEC) and vinylene carbonate (VC).

On the cells in Examples 19 to 25, the cycle life tests were performed under the same condition as described above for the purpose of investigating the effect of the volume mixing ratio of ethylene carbonate, a cyclic carbonate, on the cycle life characteristics of the cells, and thus capacity retention of the cells were obtained at the 400th cycle. The obtained results are shown in Table 3.

TABLE 3

| | Composition of mixed solvent vol % | | | Composition of additive wt % | | Capacity retention at 400th cycle |
|---|---|---|---|---|---|---|
| | EC | DMC | DEC | VEC | VC | % |
| Example 19 | 10 | 90 | 0 | 0.3 | 0.5 | 67.7 |
| Example 20 | 20 | 80 | 0 | 0.3 | 0.5 | 82.5 |
| Example 21 | 30 | 70 | 0 | 0.3 | 0.5 | 81.4 |
| Example 22 | 40 | 60 | 0 | 0.3 | 0.5 | 80.8 |
| Example 23 | 50 | 50 | 0 | 0.3 | 0.5 | 78.2 |
| Example 24 | 60 | 40 | 0 | 0.3 | 0.5 | 73.5 |
| Example 25 | 80 | 20 | 0 | 0.3 | 0.5 | 59.5 |

As shown in Table 3, it has been found that the capacity retention at the 400th cycle can be made large, that is, nonaqueous electrolyte secondary cells having excellent cycle life characteristics can be obtained in Examples 20 to 23 where the mixing ratios of ethylene carbonate (EC) fall in the range from 20 to 50 vol %. On the contrary, both in Example 19 where the mixing ratio of EC is smaller than the above range and in Examples 24 and 25 where the mixing ratio of EC are larger, the capacity retention are 73.5% or below. Thus, preferably the mixing ratio of EC can be said to be within the range from 20 to 50 vol %.

On the cells in Examples 26 to 31 and Comparative Examples 7 to 9, the cycle life tests were performed under the same condition as described above, for the purpose of investigating the effect of the weight ratios of vinyl ethylene carbonate (VEC) and vinylene carbonate (VC) as additives on the cycle life characteristics of the cells, and thus capacity retention of the cells were obtained at the 400th cycle.

On the cells in Example 27 and Comparative Examples 5 to 9, measurements were made on the cell thickness increment and growth rate of internal resistance which were defined as follows:

The cell thickness increment (mm)=(the cell thickness at the 400th cycle)−(the cell thickness at the first cycle); and The growth rate of internal resistance (%)=((the internal resistance at the 400th cycle)−(the internal resistance at the first cycle))/(the internal resistance at the first cycle)×100.

The results thus obtained are shown in Table 4.

TABLE 4

| | Composition of mixed solvent vol % | | | Composition of additive wt % | | Capacity retention at 400th cycle | Cell thickness increment | Growth rate of internal resistance |
|---|---|---|---|---|---|---|---|---|
| | EC | DMC | DEC | VEC | VC | % | mm | % |
| Comparative example 7 | 30 | 70 | 0 | 0 | 0 | 59.8 | 0.56 | 55.2 |
| Comparative example 8 | 30 | 70 | 0 | 0 | 0.5 | 71.6 | 0.52 | 37 |
| Comparative example 9 | 30 | 70 | 0 | 0.5 | 0 | 69.5 | 0.54 | 45.4 |
| Example 26 | 30 | 70 | 0 | 0.01 | 0.01 | 73.7 | — | — |
| Example 27 | 30 | 70 | 0 | 0.5 | 0.5 | 82.5 | 0.35 | 29 |
| Example 28 | 30 | 70 | 0 | 0.01 | 5 | 79.4 | — | — |
| Example 29 | 30 | 70 | 0 | 2 | 0.01 | 77.2 | — | — |
| Example 30 | 30 | 70 | 0 | 2 | 5 | 77 | — | — |
| Example 31 | 30 | 70 | 0 | 4 | 8 | 70.4 | — | — |

As shown in Table 4, not only the capacity retention at the 400th cycle were lowered, but also the cell thickness increment and growth rate of internal resistance were increased in Comparative Example 7 where vinyl ethylene carbonate (VEC) and vinylene carbonate (VC) were not contained, and in Comparative Examples 8 and 9 where either VEC or VC was contained.

On the other hand, the capacity retention could be made especially large in the cells of Examples 26 to 30 where the contents of vinyl ethylene carbonate (VEC) are 0.01 wt % or above and 2 wt % or below, and the contents of vinylene carbonate (VC) are 0.01 wt % or above and 5 wt % or below, on the basis of a nonaqueous solvent consisting of a cyclic carbonate and a chain carbonate. The cell thickness increment and growth rate of internal resistance are also small in the cell of Example 27 where the contents of VEC and VC are within the respective ranges described above. The capacity retention is slightly lowered in the cell of Comparative Example 31 where the contents of VEC and VC are large. Accordingly, it is clear that a nonaqueous electrolyte secondary cell manifesting excellent cycle life characteristics can be obtained by adjusting the contents of VEC and VC contained as additives.

Incidentally, similar results were obtained when either a mixed solvents consisting of ethylene carbonate (EC) (30 vol %) and diethyl carbonate (DEC) (70 vol %) or a mixed solvent consisting of ethylene carbonate (EC) (30 vol %), dimethyl carbonate (DMC) (40 vol %), and diethyl carbonate (DEC) (30 vol %) was used in place of the above described mixed solvent (EC (30 vol %) and DMC (70 vol %)).

According to the nonaqueous secondary cell of the present invention, a nonaqueous secondary cell can be obtained which is excellent in the charge and discharge characteristics, cycle life characteristics, and characteristics for being allowed to stand at high temperature.

The present invention provides effective means for a nonaqueous secondary cell which uses such an outer casing low in resistance to pressure as a laminate or an aluminum casing, and its effect is significant.

What is claimed is:

1. A nonaqueous secondary cell comprising:
a positive electrode capable of absorbing and releasing lithium;
a negative electrode capable of absorbing and releasing lithium; and
an electrolyte comprising a nonaqueous solvent and a lithium salt dissolved therein,
wherein said electrolyte contains a vinyl ethylene carbonate compound represented by the general formula (1), (1)

wherein $R^1$, $R^2$, $R^3$, $R^4$, $R^5$ and $R^6$ represent each independently a hydrogen atom or an alkyl group having from 1 to 4 carbon atoms,
said electrolyte contains at least a compound selected from the group consisting of a cyclic sulfonic acid ester, a cyclic sulfuric acid ester, and a cyclic acid anhydride, and said electrolyte contains the cyclic sulfonic acid ester, wherein said cyclic sulfonic acid ester comprises 1,3-propene sultone.

2. The nonaqueous secondary cell according to claim 1, wherein said nonaqueous solvent contains γ-butyrolactone.

3. The nonaqueous secondary cell according to claim 2, wherein said lithium salt includes $LiBF_4$ and $LiPF_6$.

4. The nonaqueous secondary cell according to claim 1, wherein the total content of said vinyl ethylene carbonate compound, said cyclic sulfonic acid ester, said cyclic sulfuric acid ester, and said cyclic acid anhydride is 0.05 wt % or above and 5 wt % or below relative to the total weight of said electrolyte.

5. The nonaqueous secondary cell according to claim 4, wherein said nonaqueous solvent contains γ-butyrolactone.

6. The nonaqueous secondary cell according to claim 1, wherein said electrolyte contains the cyclic sulfuric acid ester, and wherein said cyclic sulfuric acid ester comprises glycol sulfate.

7. The nonaqueous secondary cell according to claim 6, wherein said nonaqueous solvent contains γ-butyrolactone.

8. The nonaqueous secondary cell according to claim 1, wherein said electrolyte contains the cyclic acid anhydride, wherein said cyclic acid anhydride is at least one selected from the group consisting of a succinic anhydride, a glutaric anhydride, a maleic anhydride, a citraconic anhydride, a diglycolic anhydride, a cyclohexanedicarboxylic anhydride, a 4-cyclohexene-1,2-dicarboxylic anhydride, a 3,4,5,6-tetrahydrophthalic anhydride, a 5-norbornene-2,3-dicarboxylic anhydride, a phenylsuccinic anhydride, and a 2-phenylglutaric anhydride.

* * * * *